US012766895B2

(12) United States Patent
Olsen et al.

(10) Patent No.: US 12,766,895 B2
(45) Date of Patent: Oct. 20, 2026

(54) TIRE HOOK ASSEMBLY FOR TIRE CHANGER

(71) Applicant: Hunter Engineering Company, St. Louis, MO (US)

(72) Inventors: Michael Olsen, Lake St. Louis, MO (US); Joshua Dierking, Leslie, MO (US)

(73) Assignee: Hunter Engineering Company, Bridgeton, MO (US)

( * ) Notice: Subject to any disclaimer, the term of this patent is extended or adjusted under 35 U.S.C. 154(b) by 315 days.

(21) Appl. No.: 18/703,231

(22) PCT Filed: Oct. 25, 2022

(86) PCT No.: PCT/US2022/047716
§ 371 (c)(1),
(2) Date: Apr. 19, 2024

(87) PCT Pub. No.: WO2023/076258
PCT Pub. Date: May 4, 2023

(65) Prior Publication Data
US 2025/0229579 A1 Jul. 17, 2025

Related U.S. Application Data

(60) Provisional application No. 63/272,024, filed on Oct. 26, 2021.

(51) Int. Cl.
*B60C 25/05* (2006.01)
*B60C 25/138* (2006.01)

(52) U.S. Cl.
CPC ...... *B60C 25/0578* (2013.01); *B60C 25/0527* (2013.01); *B60C 25/138* (2013.01)

(58) Field of Classification Search
CPC ..... B60C 25/01; B60C 25/05; B60C 25/0515; B60C 25/0518; B60C 25/0521;
(Continued)

(56) References Cited

U.S. PATENT DOCUMENTS 8,973,640 B1 * 3/2015 Hanneken ........... B60C 25/0578 157/1.22
9,370,975 B2 * 6/2016 Kirstätter .............. B60C 25/138
(Continued)

FOREIGN PATENT DOCUMENTS

CN 202935102 U * 5/2013 ......... B60C 25/0578
EP 2463125 A1 * 6/2012 ......... B60C 25/0578
(Continued)

OTHER PUBLICATIONS

International Search Report for corresponding PCT/US2022/047716 mailed on May 16, 2023.
(Continued)

*Primary Examiner* — Robert J Scruggs
(74) *Attorney, Agent, or Firm* — Sandberg Phoenix & von Gontard, PC

(57) ABSTRACT

A tire changer demount tool assembly configured to automatically orient towards a tire and wheel assembly secured for rotation about a drive assembly of a tire changing machine. The demount tool assembly including a linearly driven demount tool biased to traverse a predetermined path of motion during a tire demount procedure.

19 Claims, 9 Drawing Sheets

(58) Field of Classification Search
CPC .............. B60C 25/0527; B60C 25/053; B60C 25/0542; B60C 25/0551; B60C 25/0563; B60C 25/0578; B60C 25/0581; B60C 25/132; B60C 25/135; B60C 25/138
See application file for complete search history.

(56) References Cited

U.S. PATENT DOCUMENTS

| | | | |
|---|---|---|---|
| 2012/0061028 | A1 | 3/2012 | Barbetti et al. |
| 2020/0324590 | A1 | 10/2020 | Corghi |

FOREIGN PATENT DOCUMENTS

| | | | | | |
|---|---|---|---|---|---|
| EP | 2599648 | A1 | | 6/2013 | |
| EP | 3608129 | B1 | | 3/2021 | |
| EP | 3865321 | A1 | | 8/2021 | |
| EP | 3865321 | B1 | * | 7/2023 | ........... B60C 25/138 |

OTHER PUBLICATIONS

Written Opinion for corresponding o PCT/US2022/047716 mailed on May 16, 2023.
European Extended Search Report in connection with European Application No. 25217880.1 mailed Mar. 3, 2026.

* cited by examiner

TIRE HOOK ASSEMBLY FOR TIRE CHANGER

CROSS-REFERENCE TO RELATED APPLICATIONS

The present application is the US National Stage under 35 U.S.C. § 371 et. seq. of International Application No. PCT/US2022/047716, filed on Oct. 25, 2022 which is related to, and claims priority from, U.S. Provisional Patent Application Ser. No. 63/272,024 field on Oct. 26, 2021, both of which are herein incorporated by reference.

STATEMENT REGARDING FEDERALLY SPONSORED RESEARCH

Not Applicable.

BACKGROUND OF THE INVENTION

The present application is directed generally towards a tire changer demount tool assembly and tire demounting procedure, and in particular, towards a tire demount tool assembly configured to automatically orient towards a tire and wheel assembly, which includes a linearly driven demount tool biased to traverse a predetermined path of motion during a tire demount procedure.

The process of removing a tire from a wheel rim and replacing it with another tire, referred to herein as tire changing, can be difficult due to the forces required to stretch and draw a tire bead over the edges of a wheel rim. In response to such difficulties, machines have been developed to facilitate the tire changing process. These tire changing machines 10, such as shown in FIG. 1, commonly include a base 12 supporting a clamping mechanism and drive assembly 14 that rotates a wheel rim about a rotational axis when the drive assembly 14 and wheel rim are located at a working position on the tire changer 10. One or more bead breaker tools 16 (typically upper and lower tools) exerts pressure on the tire adjacent to the wheel rim to break loose the tire bead seal. A tire removal tool, sometimes referred to as a demount tool or tire hook 18, is used to pull the bead of the tire off the wheel rim as the wheel rim is rotated about the axis by the drive assembly, allowing the tire to be separated from the rim for removal. These tools 16 and 18 may be utilized in the reverse process of mounting a tire onto the wheel rim. While known tire changing machines 10 have obtained a level of success in reducing the time and labor associated with changing a tire, there remains room for improvement, such as in cost efficient construction and increased safety measures for the operator.

BRIEF SUMMARY OF THE INVENTION

In one embodiment of the present disclosure, tire changer machine for changing a tire on a wheel rim, comprises a base, a drive assembly, a support column. A tool arm is coupled to the support column in a fixed orientation towards the drive assembly. A tool assembly is pivotally coupled to the tool arm by a mounting bracket. A guide member is rigidly coupled to the mounting bracket at a first end, and carries a demount tool assembly constrained for linear motion along a portion of the guide member. The demount tool assembly supports a tire demount tool for pivoting movement about a pivot axis, and for sliding contact with a mount/demount head located at a second end of the guide member. The demount tool is held in a retracted position when the demount tool assembly is linearly positioned adjacent to the first end of the guide member, and is biased to rotate about the pivot axis towards an extended position relative to the mount/demount head as the demount tool assembly linearly moves along the guide member towards the second end.

In a further embodiment of the present disclosure, the drive assembly is configured for linear movement between a wheel assembly mounting position and a working position responsive to a diameter of the wheel assembly, along a movement path offset from the support column. To accommodate tire and wheel rim combinations of differing diameters, the support column is configured for rotational movement about a vertical axis to orient the tool assembly in an operative position responsive to the diameter of the tire and wheel rim combination located in the working position.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
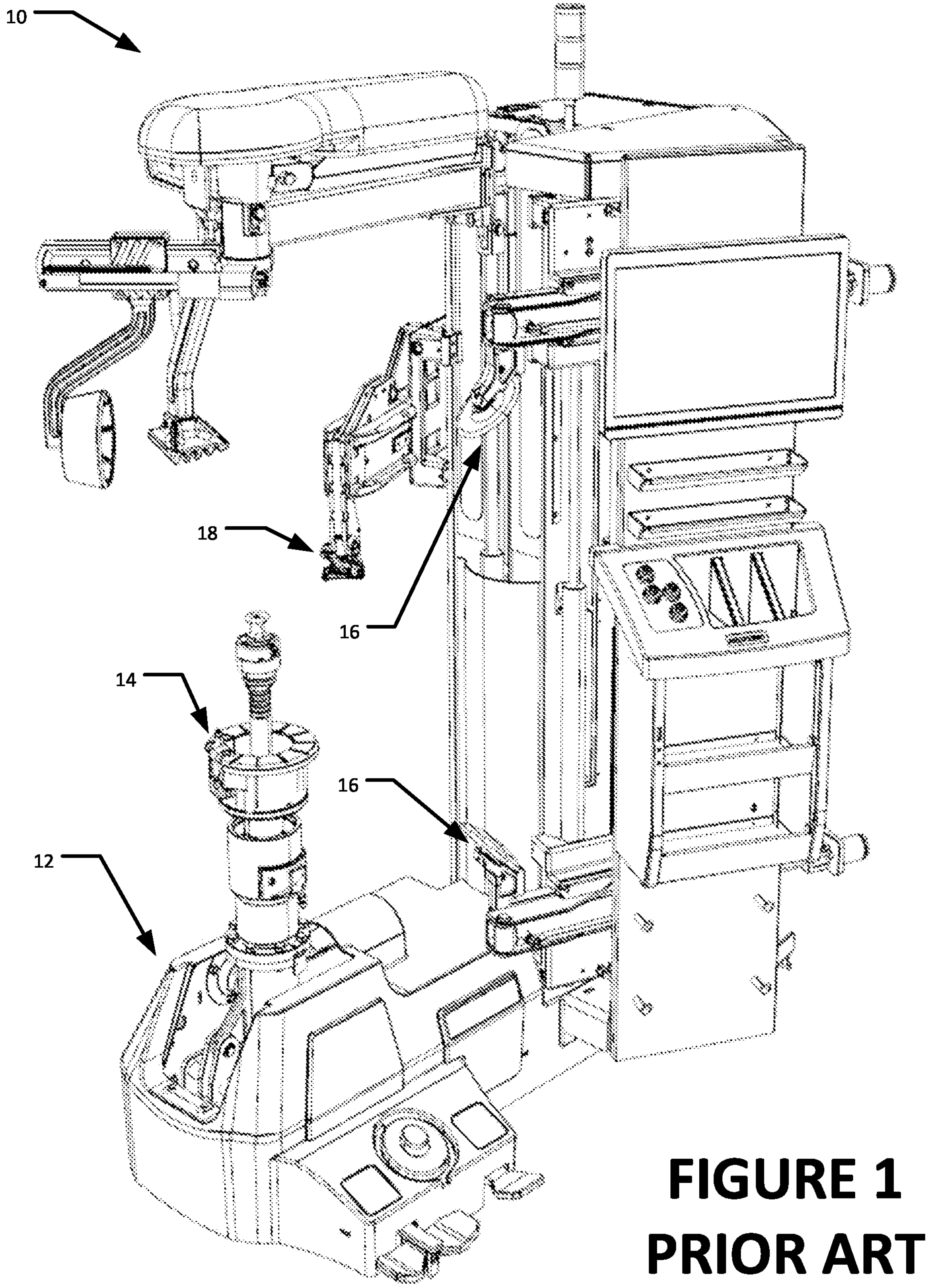
FIGURE 1 PRIOR ART
FIG. 1 is a perspective view of a prior art tire changing system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
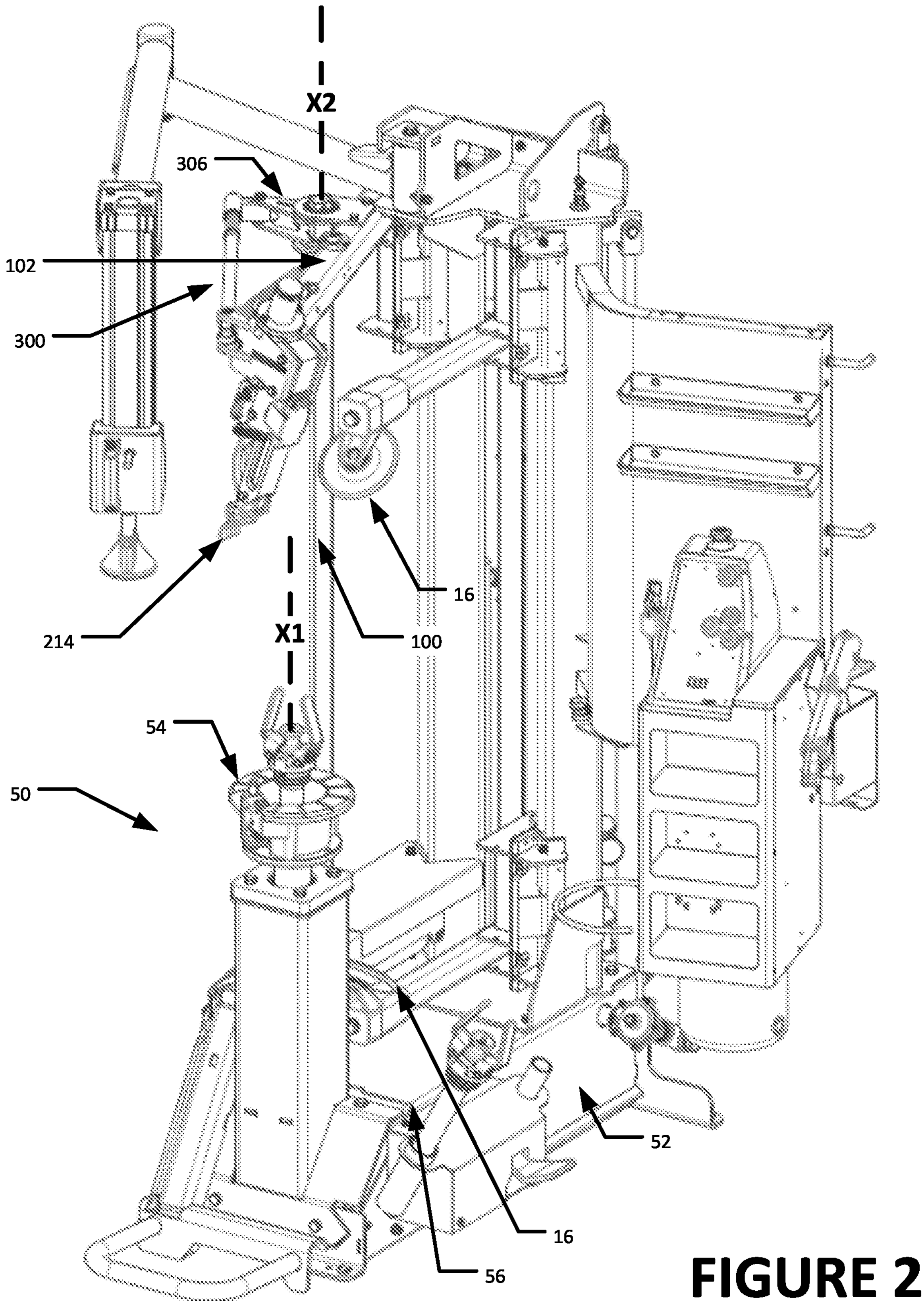
FIG. 2 is a perspective view of a tire changing system of the present disclosure.

In one embodiment of the present disclosure shown in FIG. 2, a tire changer machine 50 for changing a tire on a wheel rim, comprises a base 52 and a drive assembly 54 movable along a predetermined linear path 56 on the base 52 and configured to rotate a wheel assembly around a vertical drive axis X. At least one support column 100 is coupled to the base 52 and is rotatable about a second vertical axis X2, parallel to the vertical drive axis X1 of the drive assembly 54. A tool arm 102, shown in FIG. 2, is secured to the support column 100 in a fixed orientation relative there to, within an operative range of the wheel assembly secured to the drive assembly. A tool assembly 200, shown in FIGS. 3-6, is coupled to the tool arm 102 by a pivot 201 which is aligned parallel to the support column 100, and which passes through a mounting bracket 202. The mounting bracket 202 rigidly secures a first end of a guide member 204 at an angle relative to a longitudinal axis of the tool arm 102 and the vertical axis Y of the support column 100. The guide member 204 in turn supports a demount tool assembly 206 having a demount tool 210 (tire hook) configured for generally vertical movement along an arcuate path to engage a tire bead of the wheel assembly during a tire demounting procedure.

Movement of the demount tool 210 is constrained by a controlled linear motion of the demount tool assembly 206 along the length of the guide member 204, as well as a spring-biased sliding contact the demount tool 210 against a mount/demount head 214 secured to a second end of the guide member 204, opposite from the mounting bracket 202. In the embodiment shown in FIGS. 2-6, the linear motion of the demount tool assembly 206 is constrained by a portion of the guide member 204, such as a track, linear slot, or channel 208 integrally formed into the guide member 204. For example, the demount tool assembly 206 as shown incorporates one or more rollers 207 which each pass between opposite outer flange plates 209 of the demount tool assembly 206, through the channel 208, to secure the demount tool assembly 206 for sliding motion along the guide member 204.

Figure 3:
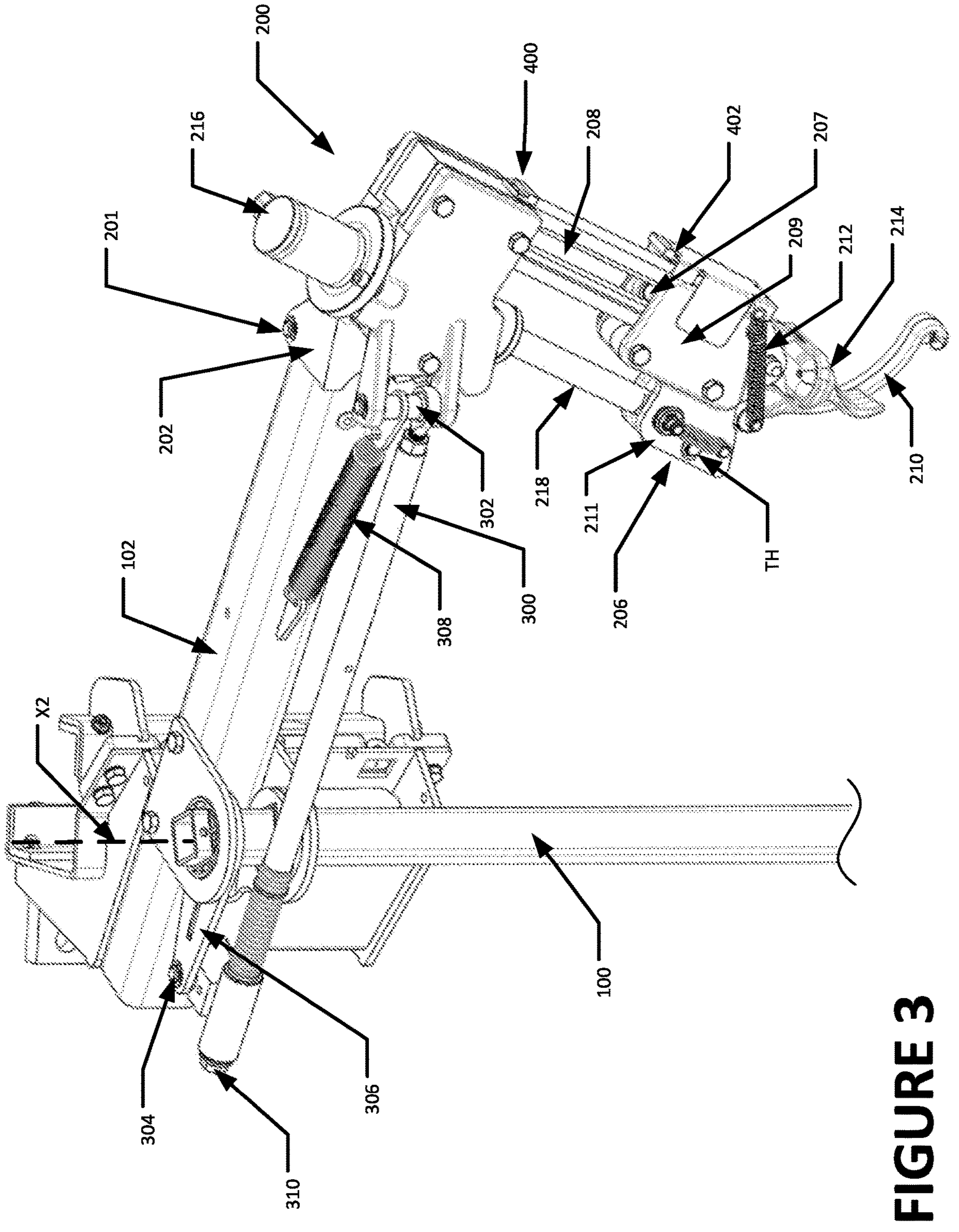
FIG. 3 is a perspective view of a tool support and tool assembly of FIG. 2.
Figure 4:
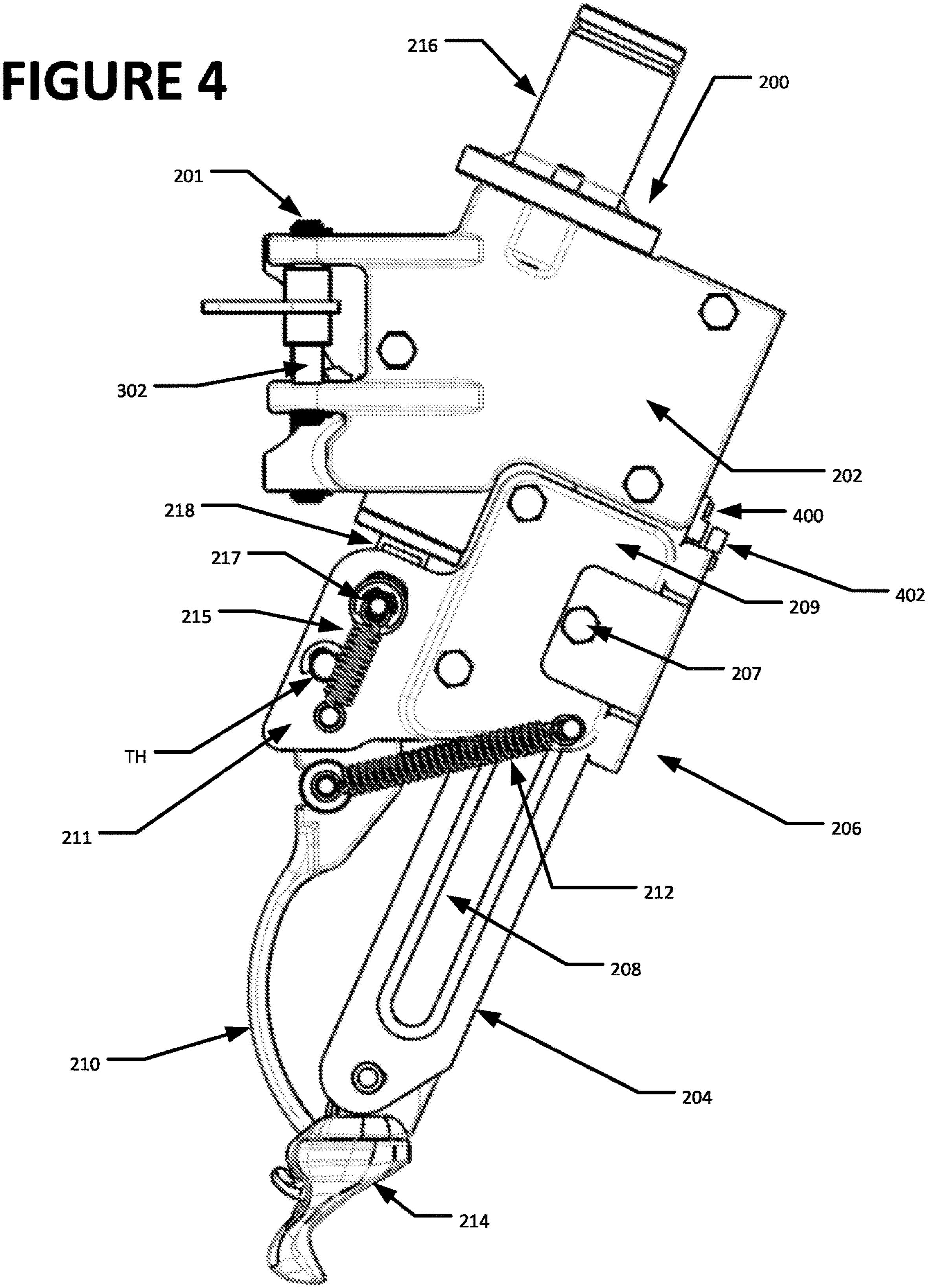
FIG. 4 is a side plan view of the tool assembly of FIG. 3, with the demount tool in a retracted position.
Figure 5:
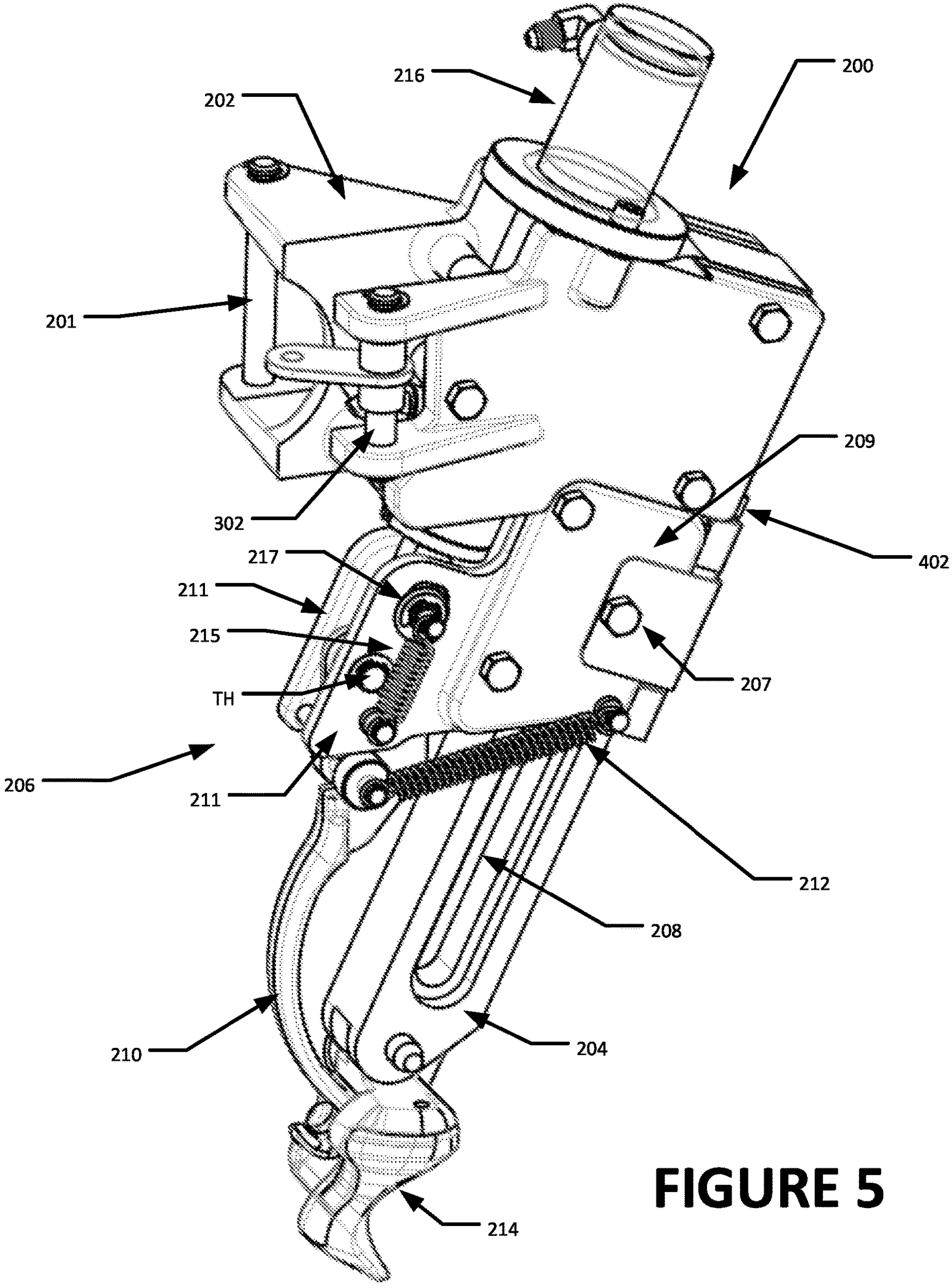
FIG. 5 is a perspective view of the tool assembly of FIG. 3.
Figure 6:
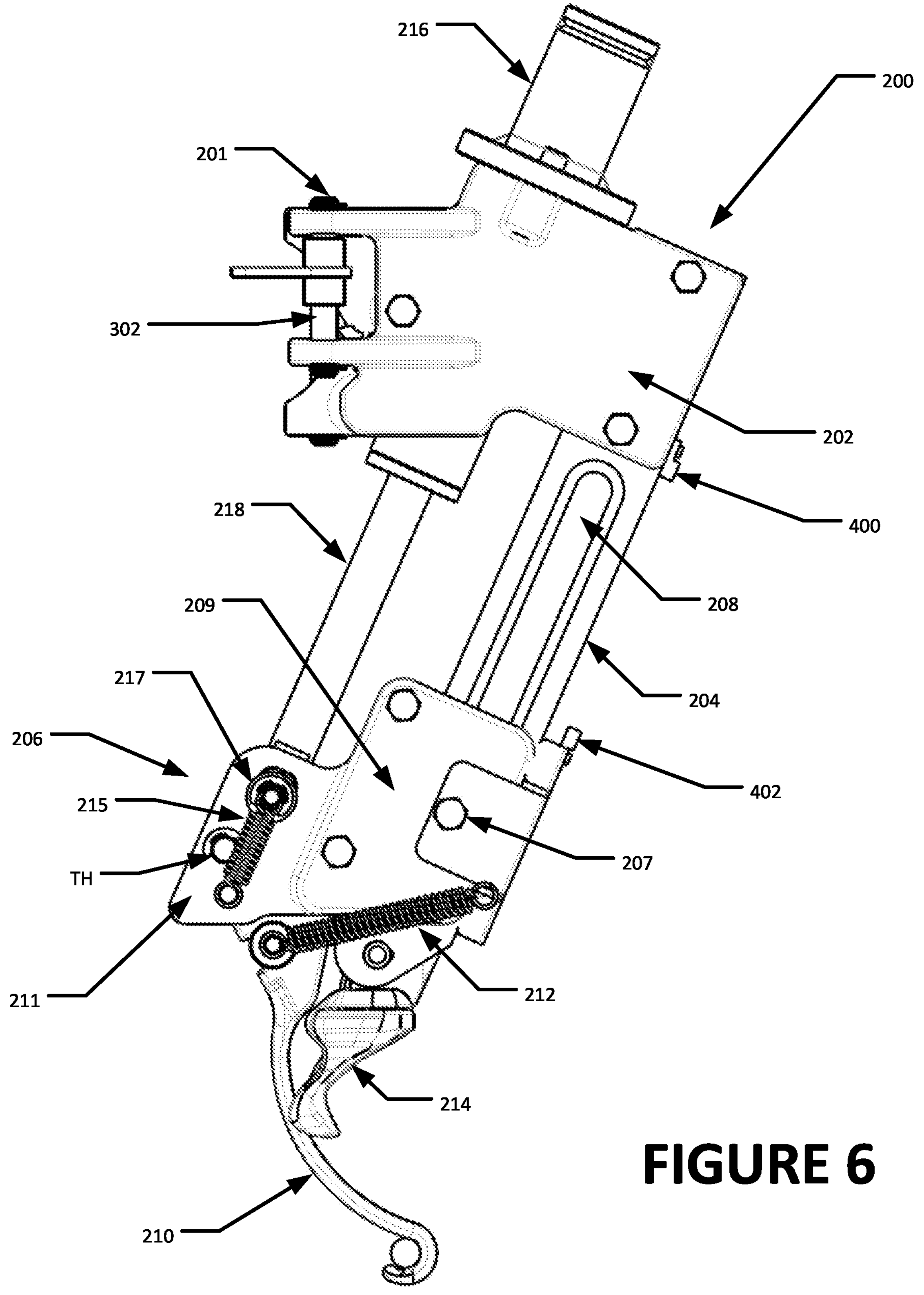
FIG. 6 is a side plan view of the tool assembly of FIG. 3, with the demount tool in an extended position for engaging a tire bead.

The demount tool 210 is a curved member configured with a rounded hook at a working end for engaging and retaining a tire bead during a tire demount procedure. The opposite end of the demount tool 210 is supported between a pair of inner flange plates 211 about a pivot axis TH, spaced apart from the guide member 204. At least one spring 212, coupled between a connector on the demount tool 210 adjacent the pivot axis TH, and a second connector on the outer flange plate 209 biases the tire hook 210 towards a tire-engaging position in which the demount tool 210 extends below the mount/demount head 214, as shown in FIGS. 2, 5, and 6. When the demount tool assembly 206 is linearly moved along the guide member 204 towards the first end, the demount tool 204 is retracted towards a rest position as seen in FIGS. 3-4 by a sliding contact with the mount/demount head 214 and a bias force exerted by at least one second spring 215 coupled between the inner flange plate 211 and a retention pin 217 passing through an elongated slot in the flange plate 211 to engage an actuator shaft 218. The springs 212 act to bias the demount tool 204 against the mount/demount head 214 throughout the range of motion permitted by the linear movement and engagement with the guide member 204, while the springs 215 act to bias the demount tool 204 into a vertically withdrawn position against the mount/demount head 214 when the demount tool assembly 206 is in the rest position.

Linear movement of the demount tool assembly 206 along the guide member 204 is imparted by a linear actuator 216 secured to the mounting bracket 202. The linear actuator 216 includes an actuator shaft 218 extending parallel to the guide member 204 and coupled to the inner flanges 211 by the spring-biased retention pin 217. Exemplary linear actuators include hydraulic or a pneumatic cylinders, however, electronic or mechanical mechanisms with or without an actuator shaft, but which are configured to enable controlled bi-directional movement of the demount tool assembly 206 along the guide member 204 are contemplated within the scope of the present disclosure.

Figure 7:
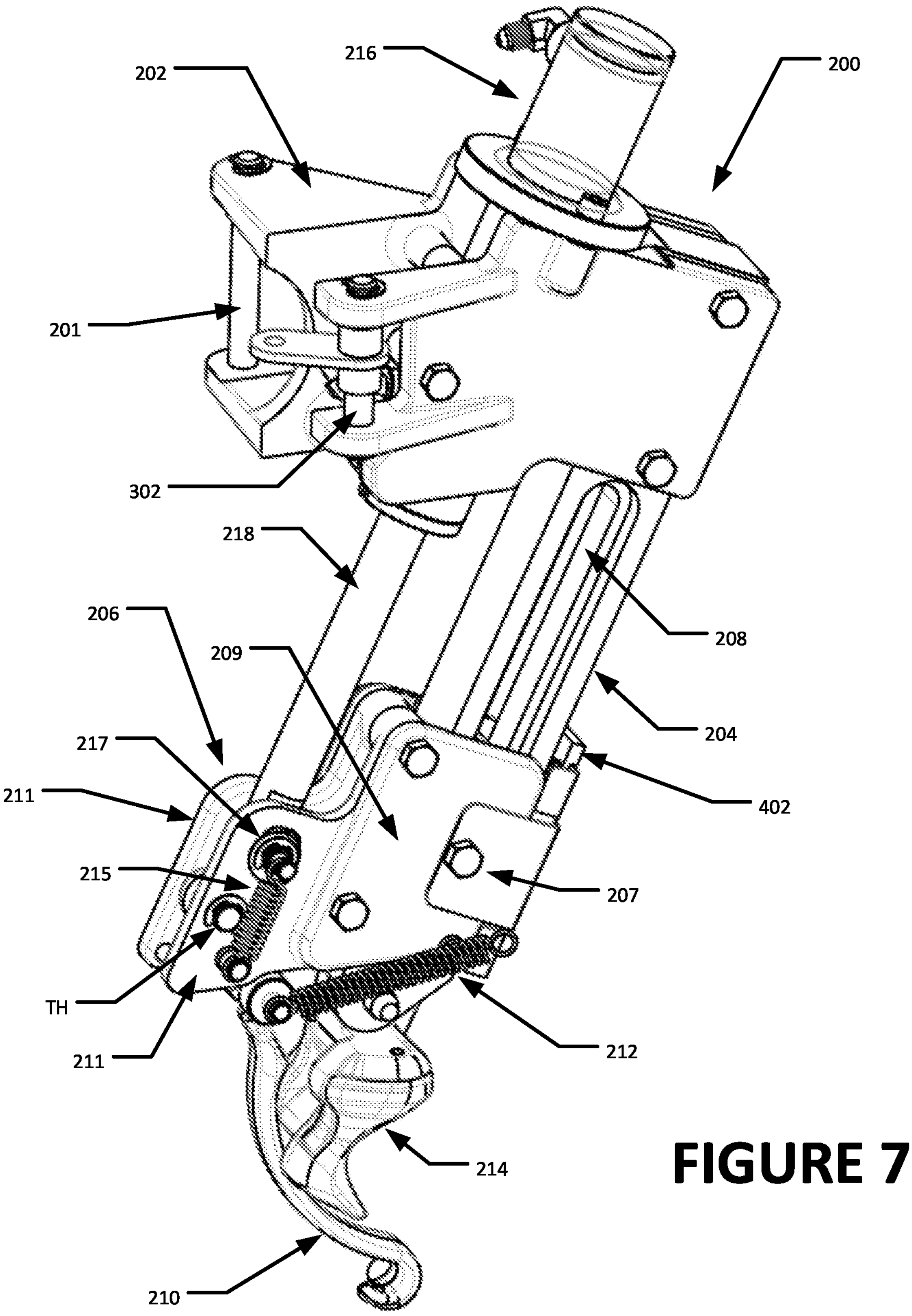
FIG. 7 is a perspective view of the tool assembly of FIG. 6.
Figure 8:
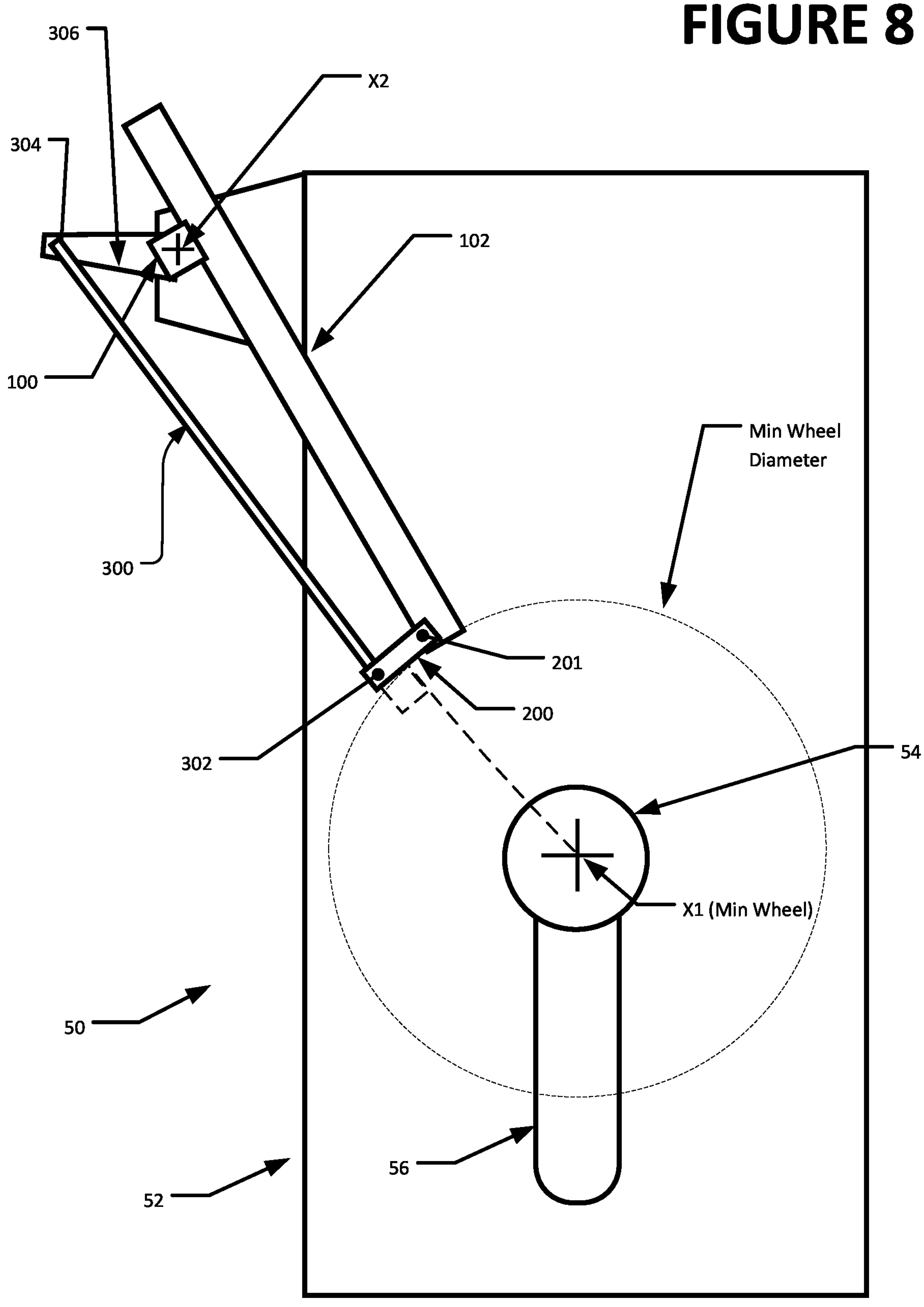
FIG. 8 is a simplified top view illustrating a configuration of said tool assembly, tool arm, and steering linkage relative to a minimum diameter wheel assembly carried by said drive assembly.
Figure 9:
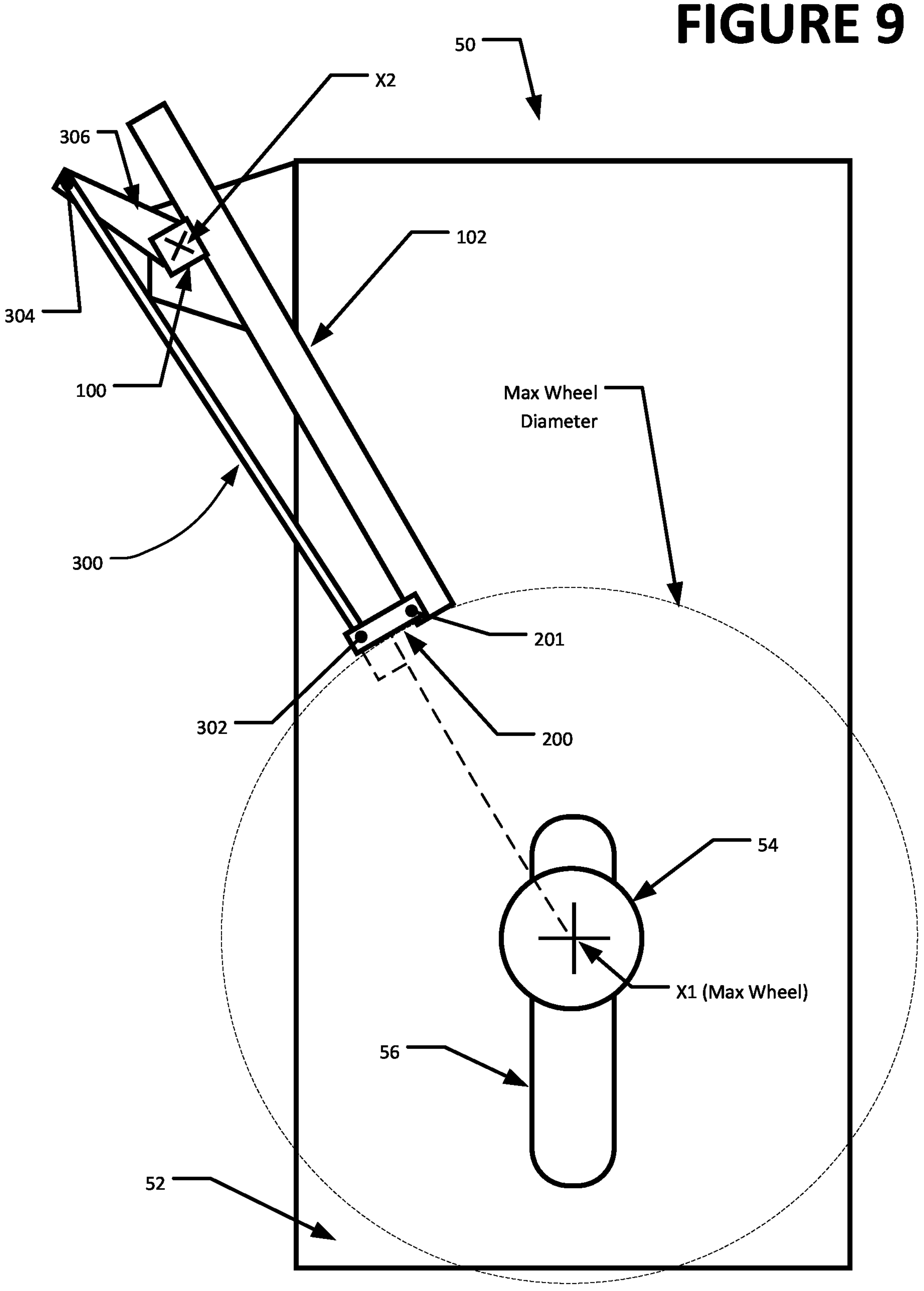
FIG. 9 is a simplified top view illustrating a configuration of said tool assembly, tool arm, and steering linkage relative to a maximum diameter wheel assembly carried by said drive assembly.

In a further embodiment of the present disclosure, the drive assembly 54 supporting the wheel assembly during a tire change operation is configured for predetermined movement between a wheel assembly loading position and a wheel assembly working position, along the linear path 56 offset from the support column 100. In the loading position, the drive assembly 54, including a spindle and flange for receiving the wheel assembly, is located adjacent to the front of the base 52, providing an operator with easy access for either securing or removing a tire and wheel assembly. After a wheel assembly is secured in place, the drive assembly 54 is moved to the wheel assembly working position, bringing the wheel assembly into the operative range of the various tire handling tools, such as the demount tool 210 and the mount/demount head 214. To accommodate wheel assemblies having different diameters of tire and rim combinations, the wheel assembly working position of the drive assembly 54 rotational axis varies in accordance with a at least one dimension of the wheel assembly, such as an outer diameter of the tire, as seen in FIGS. 7 and 8.

Proper operation of the tools carried on the tool assembly 200 requires that the tools be oriented towards the working position of the drive assembly rotational axis for a given wheel assembly combination of tire and rim. Since the tool arm 102 is secured at a fixed orientation, it becomes necessary to alter the orientation of the tool assembly 200 relative to the longitudinal axis of the tool arm 102 in order to maintain the required orientation of the tool assembly 200 relative to the given wheel assembly. As seen in FIG. 2, the mounting bracket 202 of the tool assembly 200 is secured to the tool arm 102 by the pivot 201, which permits the tool assembly 202 to rotate about an axis oriented perpendicular to the longitudinal axis of the tool arm 102. Rotation about the axis of pivot 201 enables the tool assembly 200 to adjust a facing orientation of the mount/demount head 214 and tire hook 210 towards the drive assembly rotational axis X, as required to accommodate wheel assemblies of different sizes as shown in FIGS. 7 and 8. Adjustment of the tool assembly 200 facing orientation towards the drive assembly rotational axis X may be done manually by an operator, or may be automated.

In an embodiment of the present disclosure, the adjustment of the tool assembly 200 facing orientation is facilitated by a mechanical system consisting of a steering linkage 300 coupling between a first pivot 302 on the mounting bracket 202 of the tool assembly 200, and a second pivot 304 located on an offset arm 306 affixed to, and rotating with, the support column 100. A bias spring 308 as shown in FIG. 2 acts to bias the tool assembly 200 towards the steering linkage 300. With pivot 201 in a fixed position at the end of the tool arm 102, rotation of the support column carrying the offset arm 306 moves the second pivot 304 along a first arcuate path about the axis Y of the support column in response to rotation of the offset arm 306, which in turn causes the steering linkage 300 to move the first pivot 302 along a second arcuate path about the pivot 201, changing the facing orientation of the tool assembly 200. Fine adjustments to the facing orientation of the tool assembly 200, for calibration purposes, are enabled by altering the length of the steering linkage 300, such as by means of a threaded coupling 310 as shown in FIG. 2.

Coordinating the rotation of the support column 100 with the position of the drive assembly 54, such as by a mechanical linkage, interconnection, or a rotational drive under control of a logic circuit, ensures that the facing orientation of the tool assembly 200 remains aligned with the drive assembly rotational axis X in the working positions for wheel assemblies of different sizes. In one embodiment of the present disclosure, the support column 100 is physically coupled by a jointed mechanical linkage to a carriage assembly conveying the drive assembly 54 along the linear path 56. As the carriage assembly moves the drive assembly 54 along the linear path, the jointed mechanical linkage causes the support column 100 to rotate proportionally around axis Y. Those of ordinary skill in the art will recognize that a variety of mechanical, pneumatic, hydraulic, or electrical actuator elements may be utilized without departing from the scope of the invention to automatically impart rotation of the tool assembly 200 about the pivot 201 to align the facing orientation of the tool assembly 200 with the drive assembly 54 rotational axis X working positions for tire and wheel assemblies of different diameters.

It will further be recognized that movement of the various articulating elements of the tire changer of the present disclosure should be constrained or prevented during certain operating conditions as a safety measure. Accordingly, the tool assembly 200 includes, in one configuration, a position detector comprising a sensor 400 and a trigger 402. The sensor 400 is located on the mounting bracket 202 of the tool assembly 200, adjacent to the guide member 204, while the trigger 402 is carried on the outer flange plates 209 of the demount tool assembly 206. When the demount tool assembly 206 is returned to a rest position as shown in FIGS. 3 and 4, the trigger 402 is positioned within operative proximity of the sensor 400. An output from the sensor 400 is conveyed to a control logic circuit (not shown) of the tire changer, which is configured either with software instructions, or electronic lockouts, to prevent one or more movements of the tool assembly 200, support column 100, drive assembly 54, or other tools of the tire changer under predetermined operating conditions. For example, the control logic may be configured to prevent the drive assembly 54 from linear motion in the absence of an output from the sensor 400, indicating that the tire hook is in an extended position and potentially engaged with a wheel assembly secured to the drive assembly 54.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A tire changer for changing a tire on a wheel rim, the machine comprising:

a base;

a drive assembly coupled to said base and configured to rotate the wheel rim and an associated tire about a rotational axis;

a support column secured to said base;

wherein said drive assembly is configured for linear movement relative to said base along a movement path offset from said support column, between a mounting position and a working position for said tire and wheel assembly;

wherein said support column is configured for rotational movement about a vertical axis, said rotational movement responsive to said working position for said tire and wheel assembly;

a tool arm coupled to said support column at a fixed orientation;

a tool assembly coupled to the tool arm, the tool assembly including a mounting bracket secured to said tool arm, a guide member rigidly couple to said mounting bracket at a first end, and a demount tool assembly carried on said guide member;

wherein said demount tool assembly is engaged with said guide member for linear motion along said guide member; and wherein said demount tool assembly holds a demount tool biased for pivoting movement about a pivot axis by a pair of springs, each spring coupled between said demount tool and said demount tool assembly on opposite sides of said guide arm, said demount tool in sliding contact with a mount/demount head at a second end of said guide member opposite said mounting bracket, whereby said demount tool is held in a retracted position when said demount tool assembly is adjacent said first end of said guide member, and whereby said demount tool is biased to pivot about said pivot axis towards an extended position relative to the mount/demount head when said demount tool assembly is adjacent said second end of said guide member.

2. The tire changer of claim 1 wherein a linear actuator is coupled between said mounting bracket and said demount tool assembly, said linear actuator configured to impart said linear motion to said demount tool assembly along said guide member.

3. The tire changer of claim 2 wherein said linear actuator is either a hydraulic cylinder or a pneumatic cylinder, having one end coupled to said mounting bracket, and an opposite end coupled to said demount tool assembly.

4. The tire changer of claim 1 wherein said demount tool is secured for pivoting movement about said pivot axis by a retention pin coupled between a pair of inner flange plates; and wherein a pair of rollers coupled between a pair of outer flange plates each pass through a linear slot within said guide member, whereby linear motion of said demount tool assembly along said guide member is constrained by said pair of rollers within said linear slot.

5. The tire changer of claim 1 wherein said demount tool is biased to pivot about said pivot axis by at least one spring and to maintain a sliding contact with said mount/demount head.

6. The tire changer of claim 1 wherein said guide member is oriented at an acute angle relative to said tool arm.

7. The tire changer of claim 1 wherein said demount tool is secured for pivoting movement about said pivot axis by a retention pin coupled between a pair of inner flange plates; and wherein said inner flange plates are secured in sliding engagement with said guide member, whereby linear motion of said demount tool assembly along said guide member is constrained by interaction between said inner flange plates and said guide member.

8. The tire changer of claim 1 further including a position sensor associated with said demount tool assembly, said position sensor generating a signal responsive to a position of said demount tool assembly along said guide member.

9. A tire changer for changing a tire on a wheel rim, the machine comprising:

a base;

a drive assembly coupled to said base and configured to rotate the wheel rim and an associated tire about a rotational axis;

a support column secured to said base;

wherein said drive assembly is configured for linear movement relative to said base along a movement path offset from said support column, between a mounting position and a working position for said tire and wheel assembly;

wherein said support column is configured for rotational movement about a vertical axis, said rotational movement responsive to said working position for said tire and wheel assembly;

a tool arm coupled to said support column at a fixed orientation;

a tool assembly coupled to the tool arm, the tool assembly including a mounting bracket secured to said tool arm, a guide member rigidly couple to said mounting bracket at a first end, and a demount tool assembly carried on said guide member;

wherein said demount tool assembly is engaged with said guide member for linear motion along said guide member;

wherein said demount tool assembly holds a demount tool biased for pivoting movement about a pivot axis, said demount tool in sliding contact with a mount/demount head at a second end of said guide member opposite said mounting bracket, whereby said demount tool is held in a retracted position when said demount tool assembly is adjacent said first end of said guide member, and whereby said demount tool is biased to pivot about said pivot axis towards an extended position relative to the mount/demount head when said demount tool assembly is adjacent said second end of said guide member; and wherein said demount tool assembly is pivotally connected to said tool arm at a first pivot, and wherein said demount tool assembly is pivotally connected to a steering linkage at a second pivot, said steering linkage coupled to said support column by an offset arm at an end opposite said second pivot, whereby rotation of said support column displaces said steering linkage relative to said tool arm to rotate said tool assembly about said first pivot to maintain a facing orientation of said demount tool assembly towards said rotational axis of said tire and wheel assembly at said working position.

10. The tire changer of claim 9 wherein said working position of said rotational axis is associated with a diameter of said tire and wheel assembly.

11. The tire changer of claim 9 wherein said tool assembly is spring biased for rotation about said first pivot.

12. A method for operating a tire changing machine, comprising:

mounting a tire and wheel assembly to a drive assembly in a first position;

linearly moving said drive assembly towards a working position in operative reach of a tool assembly secured to a tool arm fixed to a support column, said working position responsive to a configuration of said tire and wheel assembly;

automatically rotating said support column about a vertical axis during linear movement of said drive assembly to maintain said tool arm in alignment with an axis of rotation for said drive assembly;

automatically altering a facing orientation of said tool assembly, relative to said tool arm, in response to said working position of said tire and wheel assembly; and engaging said tire and wheel assembly with said tool assembly.

13. The method of claim 12 wherein automatically altering said facing orientation of said tool assembly occurs during said linear movement of said drive assembly.

14. The method of claim 12 wherein engaging said tire and wheel assembly with said oriented tool assembly includes vertically actuating a demount tool towards an interface between said tire and said wheel of said assembly by linearly displacing a demount tool assembly of carrying said demount tool on said tool assembly from a raised position to a lowered position.

15. The method of claim 14 wherein linearly displacing said demount tool assembly from said raised position to said lowered position further pivots said demount tool about an axis during said linear displacement of said demount tool assembly.

16. The method of claim 12 wherein said working position of said drive assembly is associated with a diameter of said tire and wheel assembly.

17. A tire changer machine for changing a tire on a wheel assembly consisting of a wheel rim and tire, the machine comprising:

a base;

a drive assembly supported for predetermined movement between a mounting position and a working position by said base, said drive assembly configured to secured a wheel assembly for rotation about a rotational axis;

a support column carried by said base, said support column configured for rotation about an axis parallel to said rotational axis of said drive assembly;

a tool arm coupled to said support column at a fixed orientation;

a tool assembly coupled to the tool arm, the tool assembly including a mounting bracket secured to said tool arm, a guide member rigidly couple to said mounting bracket at a first end, and a demount tool assembly carried on said guide member;

wherein said tool assembly is pivotally connected to said tool arm at a first pivot and to a steering linkage at a second pivot, said steering linkage coupled to said support column by an offset arm at an end opposite said second pivot, whereby rotation of said support column displaces said steering linkage relative to said tool arm to rotate said tool assembly about said first pivot to maintain a facing orientation of said tool assembly towards said rotational axis of said drive assembly.

18. The tire changer of claim 17 wherein said demount tool assembly is engaged with said guide member for linear motion along said guide member; and wherein said demount tool assembly holds a demount tool biased for pivoting movement about a pivot axis, said demount tool in sliding contact with a mount/demount head at a second end of said guide member opposite said mounting bracket, whereby said demount tool is held in a retracted position when said demount tool assembly is adjacent said first end of said guide member, and whereby said demount tool is biased to pivot about said pivot axis towards an extended position relative to the mount/demount head when said demount tool assembly is adjacent said second end of said guide member.

19. The tire changer of claim 17 wherein said working position of said drive assembly is responsive to a dimension of said wheel assembly; and wherein said rotation of said support column is responsive to said working position of said drive assembly.

* * * * *